United States Patent [19]
Bogetti et al.

[11] Patent Number: 5,635,272
[45] Date of Patent: Jun. 3, 1997

[54] COMPOSITE STRUCTURE FOR TRANSMITTING HIGH SHEAR LOADS

[75] Inventors: Travis A. Bogetti, Bear, Del.; Christopher P. R. Hoppel, Hovre de Grace, Md.

[73] Assignee: The United States of America as represented by the Secretary of the Army, Washington, D.C.

[21] Appl. No.: 521,395

[22] Filed: Jul. 3, 1995

[51] Int. Cl.⁶ .................................................... B32B 5/12
[52] U.S. Cl. ........................ 428/113; 428/36.91; 428/192
[58] Field of Search ................................ 428/36.91, 113, 428/192

[56] References Cited

PUBLICATIONS

Oberg, E., F.D. Jones and H.L. Horton, "Machinery's Handbook." Twenty–First ed., ed. P.B. Shubert, 1979, New York, Industrial Press, Inc., pp. 1338–1341.

Primary Examiner—Christopher Raimund
Attorney, Agent, or Firm—Freda L. Krosnick; Muzio B. Roberto

[57] ABSTRACT

A fiber reinforced composite structure for transmitting high shear loads includes a laminate with an edge defining a buttress groove. The buttress groove includes a pressure flank oriented substantially perpendicular to a longitudinal axis of the structure to transmit shear loads in one direction only. The laminate is formed of a plurality of plies having fibers disposed in a matrix material at angular orientations relative to the longitudinal axis of the structure. A first plurality of the plies have fibers oriented parallel to the longitudinal axis and a majority of the other plies have fibers oriented at an angle θ relative to the longitudinal axis corresponding to a direction of the largest tensile component of the shear load.

11 Claims, 4 Drawing Sheets

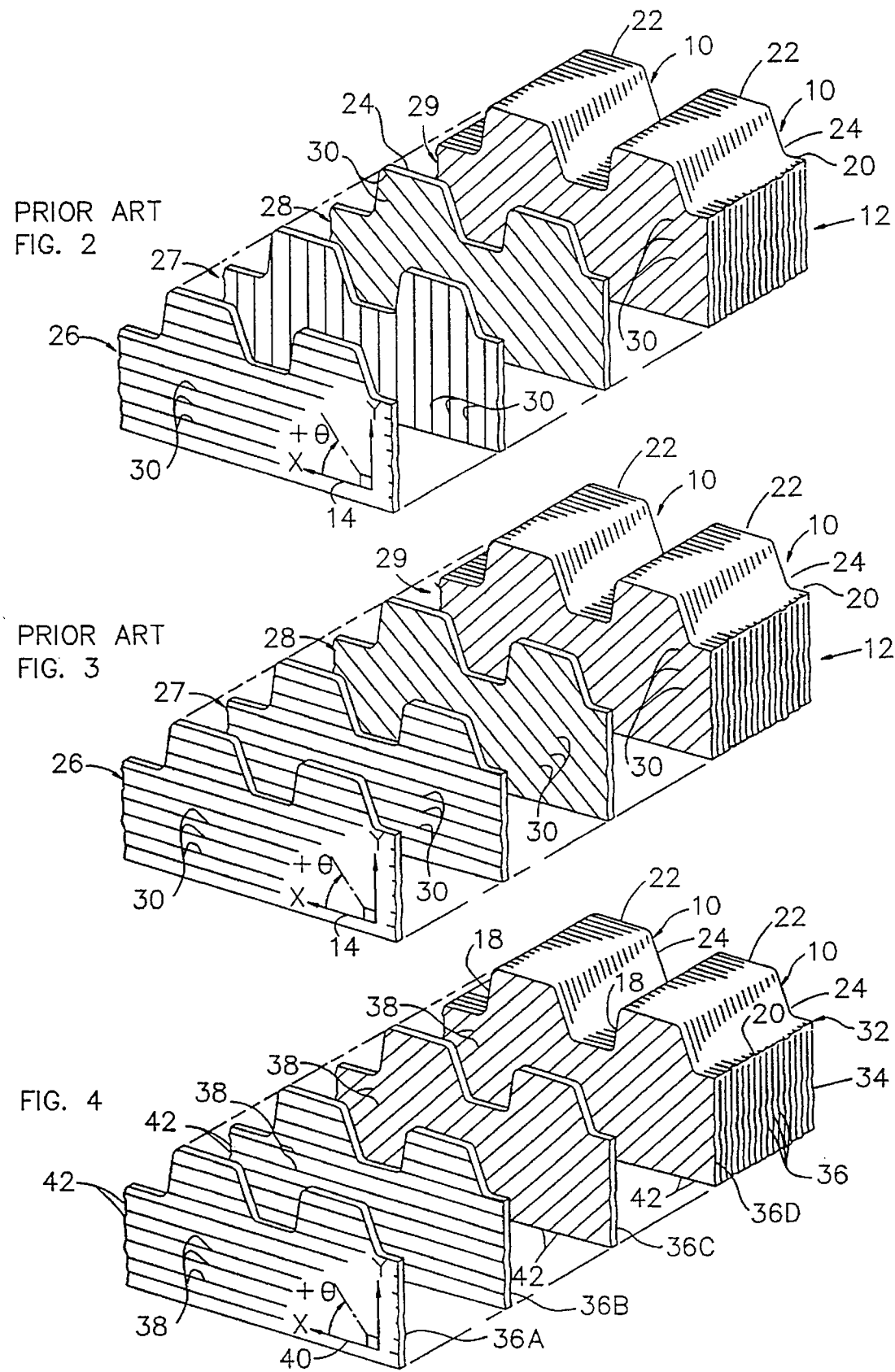

COMPOSITE STRUCTURE FOR TRANSMITTING HIGH SHEAR LOADS

BACKGROUND OF THE INVENTION

1. Field of the Invention

The present invention relates to fiber reinforced composite structures and, more particularly, to fiber reinforced composite structures formed with threads or grooves for transmitting high shear loads.

2. Discussion of the Prior Art

The buttress type of thread is often used in applications where exceptionally high shear stresses are to be transferred in one direction only between load bearing structures. The contacting flank of the thread, which takes the thrust, is commonly referred to as the pressure flank and is nearly perpendicular to the longitudinal thread axis of each load bearing structure such that the radial component of the thrust is reduced to a minimum. Because of the small radial thrust, the buttress form of thread is particularly applicable where tubular members are screwed together, as in the case of breech mechanisms of large guns, airplane propeller hubs, and columns for hydraulic presses. Grooves having substantially the same cross-sectional configuration as the buttress form of thread are often referred to as buttress grooves.

FIG. 1 is a fragmentary cross-sectional view illustrating a common form of buttress groove 10 in a load bearing structure 12. A number of such grooves are typically formed at axially spaced locations along a longitudinal axis 14 of the load bearing structure 12 to define therebetween one or more ridges 16, which can be teeth or threads depending upon the manner in which a load or thrust T is to be transferred between the load bearing structure 12 and another load bearing structure 13. Thrust T is oriented in an axial direction parallel to the longitudinal axis 14 of the load bearing structure and is shown as a force exerted by load bearing structure 13 against the load bearing structure 12. It will be appreciated that an equal and oppositely directed counterforce (not shown) is exerted by load bearing structure 12 against load bearing structure 13. For purposes of the following description, the loading force or thrust T exerted by load bearing structure 13 will be considered to be forwardly directed relative to load bearing structure 12 and the counterforce exerted by load bearing structure 12 will be considered to be rearwardly directed relative to load bearing structure 12.

A load-resisting rear face or pressure flank 18 of each buttress groove 10 of load bearing structure 12 extends upward in a transverse direction substantially perpendicular or normal to the longitudinal axis 14 of the load bearing structure 12 from a root 20 at the base of a ridge 16 to a crest 22 at the top of the ridge. The load-resisting pressure flank 18 can also be inclined toward the front end of structure 12 at an angle β, taken relative to normal, ranging from about 1° to about 5°. Crest 22 of a given ridge 16 extends forward in parallel with the longitudinal axis 14 of the load bearing structure 12 from the pressure flank 18 to a front face or flank 24 oriented at an angle α relative to the pressure flank. The angle α, commonly referred to as the thread angle, is typically about 45° for a buttress groove but can range from about 30° to about 60°.

Buttress grooves were originally developed to transfer loads between structures made of isotropic materials, such as metals. It would be desirable, however, to form buttress grooves in load bearing structures made of fiber reinforced composite materials to reduce weight and/or increase stiffness and strength. Unlike isotropic materials, however, the mechanical properties of fiber reinforced composite materials tend to be anisotropic in that the mechanical properties of the fiber reinforced composite material, such as shear strength and stiffness, are dependent upon the orientation of the reinforcing fibers. In the case of laminated fiber reinforced composite structures, the mechanical properties of the composite material are related to the orientation of fibers in the individual plies making up the structure.

In order to better understand how individual plies of a laminated fiber reinforced composite structure are oriented, a laminate X-Y coordinate system can be defined locally relative to a load bearing structure 12 as shown in FIG. 1, wherein the X axis corresponds to the axial or longitudinal axis 14 of the load bearing structure 12 and the Y axis corresponds to the lateral or radial direction, depending upon whether the load bearing structure is flat or cylindrical. Referring still to FIG. 1, it can be seen that X is taken to be positive in the rearward direction or opposite the direction of loading or thrust T, and Y is taken to be positive in the direction of grooves 10. The Z-direction or axis of the laminate X-Y coordinate system is into the plane of the figure and represents the interlaminar or through-the-thickness dimension of the laminated fiber reinforced composite structure. A similar laminate X'-Y' coordinate system can be defined locally for load bearing structure 13, as shown in FIG. 1, wherein X' is taken to be positive in the direction of loading or thrust T exerted by the load bearing structure 13 and Y' is taken to be positive in the direction of grooves 10. "Ply orientation," as used herein, refers to the angular orientation θ of the reinforcing fibers of an individual ply relative to the X-axis of the local laminate coordinate system; and, looking at FIG. 1, θ is taken to be positive in the clockwise direction or toward the buttress grooves 10.

Prior art fiber reinforced composite structures, such as those shown in FIGS. 2 and 3, have typically employed balanced and symmetric laminate architectures in combination with buttress grooves 10 formed through the thickness of the laminates to transfer loads to the composite structure. Only four adjacent plies 26, 27, 28 and 29 are shown for each prior art composite structure 12; it will be appreciated, however, that since the composite structures are formed of balanced and symmetric laminates, the sequential order of the plies or pattern indicated by the four plies shown will be repeated in reverse order as needed to achieve a desired laminate thickness. In FIG. 2, the reinforcing fibers 30 of the first ply 26 are oriented parallel to the longitudinal axis 14 of the load bearing structure 12 or at 0° relative to the X axis. Accordingly, ply 26 is referred to as a 0° ply. Ply 27 is immediately adjacent or beneath ply 26 and includes fibers 30 oriented perpendicular to the longitudinal axis 14 of the 4, load bearing structure 12 or at 90° relative to the X axis. Accordingly, ply 27 is referred to as a 90° ply. Ply 28 is immediately adjacent or beneath ply 27 and includes fibers 30 oriented at 45° relative to the X axis or substantially parallel to the front flank 24 of each groove. Accordingly, ply 28 is referred to as a +45° ply. Ply 29 is immediately adjacent or beneath ply 28 and includes fibers 30 oriented at an angle θ of −45° relative to the X axis such that the fibers are substantially perpendicular to the front flank 24 of each groove. Accordingly, ply 29 is referred to as a −45° ply. The pattern shown in FIG. 2, commonly referred to as a [0/90/+45/−45]$_s$ layup, repeats itself in reverse order through the thickness of the laminate so that, for example, the next four plies would be a −45° ply, a +45° ply, a 90° ply and a 0° ply, respectively.

In FIG. 3, the first and second plies 26 and 27 are 0° plies, the third ply 28 is a +45° ply and the fourth ply 29 is a −45° ply. This pattern, commonly referred to as a [0/0/+45/−45]$_s$ layup, repeats itself in reverse order through the thickness of the laminate so that, for example, the next four plies would be a −45°, a +45° and two 0° plies, respectively.

From the above, it will be appreciated that the prior art composite structures make use of an equal number of +45° plies and −45° plies, presumably to carry the shear loads generated in the structure; and, while the shear strength of such laminated fiber reinforced composite structures appears promising, it would be desirable to improve the shear strength of fiber reinforced composite structures having buttress grooves without increasing the number of plies or the thickness of the structure.

SUMMARY OF THE INVENTION

Accordingly, it is a primary object of the present invention to increase the shear load carrying capability of a fiber reinforced composite structure with buttress grooves.

Another object of the present invention is to optimize the shear load carrying capability of a fiber reinforced composite structure having buttress grooves by maximizing the number of plies within the structure having fibers oriented in the direction of a tensile component of the shear load while minimizing the number of plies within the structure having fibers oriented in the direction of a compressive component of the shear load.

Yet another object of the present invention is to optimize the shear load carrying capability of a fiber reinforced composite structure with buttress grooves by maximizing the number of plies with fibers oriented at −45° relative to a longitudinal axis of the structure and minimizing the number of plies with fibers oriented at +45° relative to the longitudinal axis of the structure.

Some of the advantages of the present invention over the prior art are that the shear load carrying capability of fiber reinforced composite structures with buttress grooves is improved without increasing the thickness or weight of the load bearing structure, and that the improved shear load carrying capability is achieved using known materials and methods familiar to those skilled in the art such that the cost of manufacturing the fiber reinforced composite structures is not increased.

The present invention is generally characterized in a fiber reinforced composite structure for transmitting high shear loads including a laminate having a plurality of plies with fibers disposed in a matrix material and a buttress groove defined by an edge of the laminate and having a pressure flank substantially perpendicular to a longitudinal axis of the structure. The fibers of each ply have an angular orientation relative to the longitudinal axis of the structure, wherein a first plurality of the plies have fibers oriented parallel to the longitudinal axis and a majority of the other plies have fibers oriented at an angle θ relative to the longitudinal axis corresponding to a direction of the largest tensile component of the shear load.

Another aspect of the present invention is generally characterized in a method of forming a fiber reinforced composite structure including the steps of arranging plies of a laminate such that a first plurality of the plies have fibers oriented parallel to a longitudinal axis of the structure and a majority of the other plies have fibers oriented at an angle θ relative to the longitudinal axis corresponding to a direction of the largest tensile component of a shear load carried by the structure, and forming a buttress groove along the edge of the laminate such that a pressure flank of the buttress groove is oriented substantially perpendicular to the longitudinal axis of the structure.

Other objects and advantages of the present invention will become apparent from the following description of the preferred embodiments taken in conjunction with the accompanying drawings, wherein like parts in each of the several figures are identified by the same reference numerals.

BRIEF DESCRIPTION OF THE DRAWINGS

FIG. 2 is an exploded perspective view of a prior art fiber reinforced composite structure with buttress grooves.

FIG. 3 is an exploded perspective view of another prior art fiber reinforced composite structure with buttress grooves.

FIG. 4 is an exploded perspective view of a fiber reinforced composite structure with buttress grooves according to the present invention.

DESCRIPTION OF THE PREFERRED EMBODIMENTS

Figure 1:
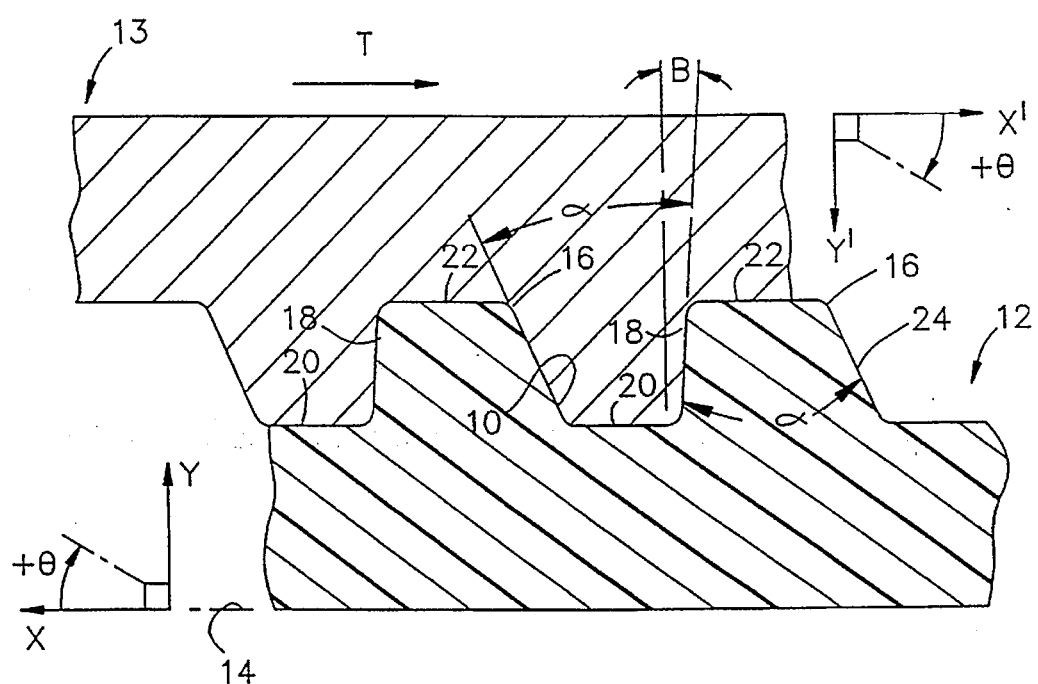
FIG. 1 is a fragmentary side view, in section, of a fiber reinforced composite structure with a buttress groove.

A fiber reinforced composite structure 32 according to the present invention, as shown in FIG. 4, includes a flat laminate 34 composed of plies 36. Plies 36 each include a plurality of continuous or discontinuous fibers 38 oriented at an angle θ relative to a longitudinal axis 40 of the fiber reinforced composite structure 32. Fibers 38 are embedded in a polymeric, metal, or ceramic matrix 42 and are made of any material having a tensile strength greater than that of the matrix material. In the case of an epoxy matrix 42, the fibers 38 are preferably made of graphite or glass.

Buttress grooves 10 are formed at spaced locations along a longitudinal edge of the laminate 34. Each buttress groove 10 includes a load resisting pressure flank 18 oriented substantially perpendicular to the longitudinal axis 40 of the composite structure and a front flank 24 tilted away from the pressure flank at an included angle α ranging from about 30° to about 60° (FIG. 1). Preferably, the front flank 24 of each groove 10 is oriented at an angle of about 45° in a counterclockwise direction relative to the pressure flank. A flat, root or bottom land 20 extends across the bottom of each groove 10 between the pressure flank 18 and front flank 24, and a similarly sized flat, crest or top land 22 extends horizontally between adjacent grooves. The crests 22 and roots 20 formed by the grooves 10 can be flattened as shown or rounded depending upon operational use of the fiber reinforced composite structure.

Referring to FIG. 1, the load resisting pressure flank 18 of each buttress groove 10 can be inclined at an angle β relative to normal ranging from about 1° to about 10° to avoid cutter interference in milling the buttress groove but is preferably inclined at an angle of about 7°.

Referring again to FIG. 4, four plies 36a, 36b, 36c and 36d are shown separated from the fiber reinforced composite structure 32 to illustrate a preferred pattern or laminate architecture of the present invention. The laminate architecture is symmetric, so it will be appreciated that the pattern indicated by the four plies shown will be repeated in reverse order as often as desired to obtain a particular laminate thickness. The first and second plies 36a and 36b include fibers 38 oriented parallel to the longitudinal axis 40 of the laminate 34 or at an angle θ of 0° relative to the X axis of the laminate coordinate system shown in FIG. 4. The third and fourth plies 36c and 36d include fibers 38 oriented perpendicular to the front flank 24 of each groove 10 or at an angle θ of about −45° relative to the longitudinal axis of the laminate or X axis of the laminate coordinate system. This basic pattern repeats itself in reverse order so that the next four plies would be a pair of −45° plies followed by a pair of 0° plies, respectively, which pattern would then be repeated in reverse order and so on.

Another, more convenient, way of describing the sequence of plies or laminate architecture in a fiber reinforced composite structure involves listing ply orientations in sequential order with individual ply orientations being separated by slashes and the basic pattern being enclosed by brackets. Thus, $[\psi_2/\phi_2]_s$ would refer to a laminate architecture wherein two plies are oriented at $\psi°$ relative to the longitudinal axis of the composite structure and the next two plies are oriented at $\phi°$ relative to the longitudinal axis. The "s" subscript outside the brackets means that the laminate architecture is symmetric, such that the basic pattern is repeated in reverse order through the thickness of the laminate. Using this shorthand notation, the laminate architecture shown in FIG. 4 can be written $[0_2/-45_2]_s$.

Figure 5:
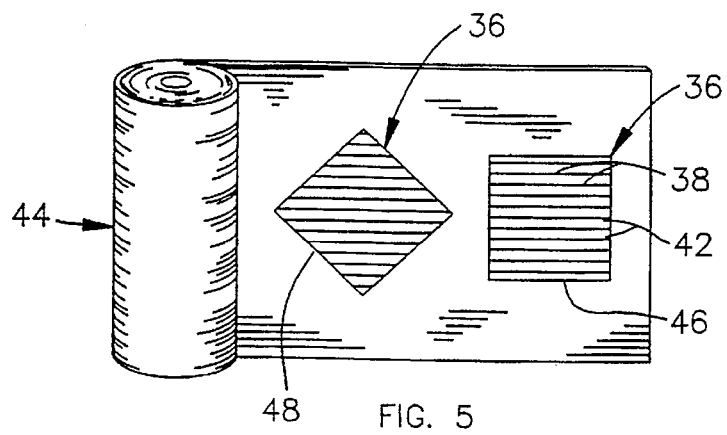
FIGS. 5–8 illustrate a method of making a fiber reinforced composite structure with buttress grooves according to the present invention.
Figure 6:
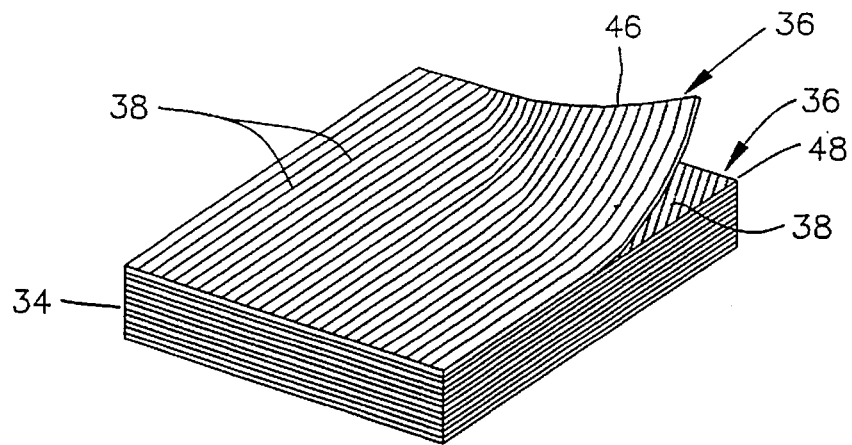
Figure 7:
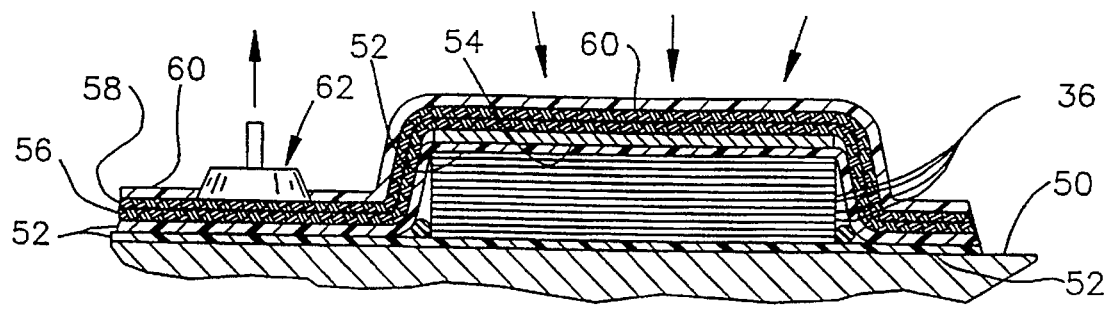

In manufacturing the fiber reinforced composite structure 32, one or more rolls 44 of prepreg material, that is rolls of woven or uniaxially oriented fibers 38 preimpregnated with uncured components of the matrix material 42, are unfurled as shown in FIG. 5, and plies 36 are cut from the rolls of prepreg at various angular orientations relative to the fiber direction of the prepreg material. In FIG. 5, for example, fibers 38 of the prepreg material are oriented parallel to the longitudinal axis or warp direction of the rolled material, such that a 0° ply can be obtained by cutting a rectangle 46 from the roll 44, and a −45° ply can be obtained by cutting a diamond 48 from the roll 44. Thereafter, all angles are measured relative to the fiber direction of the 0° ply, with positive angles being measured in a clockwise direction looking at FIG. 5 and negative angles being measured in a counterclockwise direction. An approximately equal number of 0° and −45° plies 36 are cut from the roll 44 and layed-up or stacked according to ply orientation as shown in FIG. 6 to achieve a $[0_2/-45_2]_s$ laminate architecture. Generally, in planning the sequence of plies to be layed-up, the basic pattern is calculated starting from the center of the lay-up and is repeated symmetrically in opposite directions until the desired number of plies is obtained. The plies 36 are stacked on top a rigid surface or caul plate 50 lined with a release film 52 as shown in FIG. 7. A second caul plate 54 can be placed on top of the plies 36 with another layer of release film 52 disposed between the caul plate 54 and the plies 36. Bleeder cloth 56, which can be of woven glass fibers for example, is then draped over the caul plate 54 with a layer of burlap or other loosely woven material 58 being placed atop the bleeder cloth. The entire assembly is then sealed with a nylon or rubber vacuum bag 60 having a vacuum gland attachment 62.

If the lay-up has not already been through a debulking step, for example using a platen press, the vacuum bag 60 can be evacuated by coupling a vacuum line (not shown) with the gland attachment 62 to debulk or compress the plies of the laminate prior to curing the plies. It will be appreciated that by removing air from within the vacuum bag 60 a pressure differential is created between the external atmosphere and the interior of the bag such that a net compressive force is applied to the plies in a relatively uniform manner via the caul plates 50 and 54.

The lay-up is then cured in an autoclave using the cure cycle recommended by the manufacture or supplier of the particular composite material employed. For a typical graphite fiber reinforced composite material, such as IM7/8551-7, a two step cure cycle is recommended whereby the lay-up is first heated to 210° F. for 60 minutes under vacuum and then heated for 120 minutes at 350° F. and 90° p.s.i. external pressure.

Figure 8:
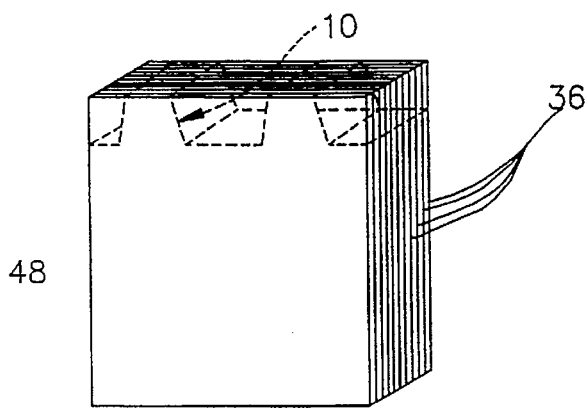

After cure, the edges of the laminate 34 are shaped or squared, preferably using a water cooled diamond saw, and buttress grooves 10 are cut into the laminate 34, as shown by dotted lines in FIG. 8, preferably using an Aluminum Oxide grinding wheel machined or dressed to the desired groove shape. If desired, fiber orientations within the laminate 34 can be confirmed using conventional ultrasonic C-scan analysis.

In tests measuring the groove strength of fiber reinforced composite structures, laminate architectures according to the present invention have outperformed prior art laminate architectures by as much as almost a factor of two. It is believed that this increase in groove strength is a direct result of having minimized the number of +45° plies used in the laminate architecture while maximizing the number of −45° plies used. Referring to FIG. 1, when a force or thrust T is applied to the pressure flank 18 of a buttress groove 10, a global (X-Y) shear stress is carried along the base of the groove and transferred into the principal coordinate system of the composite structure. While three dimensional effects and groove geometry make analysis of the composite structure difficult, it is believed that when the global shear stress is decomposed into orthogonal components along the +45° and −45° directions, the fibers 38 of the −45° plies will be loaded primarily in tension while those of any +45° plies will be loaded primarily in compression. Since tensile strength in the fiber direction is generally greater than compressive strength in the fiber direction, the laminate architecture of the present invention results in increased groove strength and greater load carrying capability.

Similar increases in groove strength can be obtained by maximizing the number of plies in a laminate having fibers oriented at any angle θ between about −30° and about −60° relative to the longitudinal axis of the fiber reinforced composite structure. Put another way, any $[0_i/+\theta_j/-\theta_k]_s$ laminate architecture wherein θ is an absolute value of ply orientation; i, j and k are integers; i is greater than 0; and k is greater than j, should outperform similar laminate architectures wherein j is greater than or equal to k.

Figure 9:
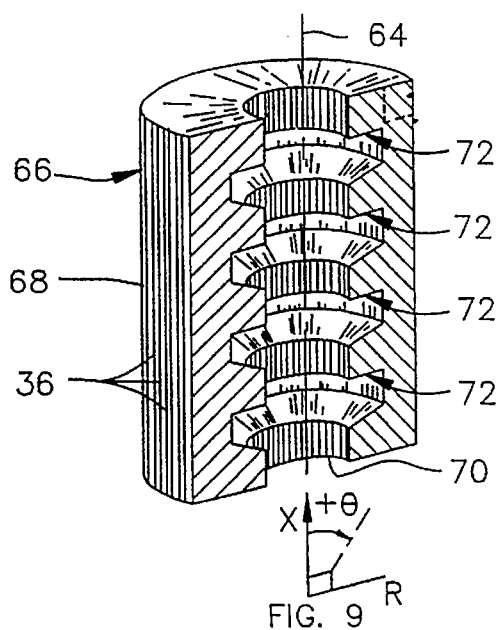
FIG. 9 is a perspective view, partly in section, illustrating a modification of the fiber reinforced composite structure according to the present invention.
Figure 10:
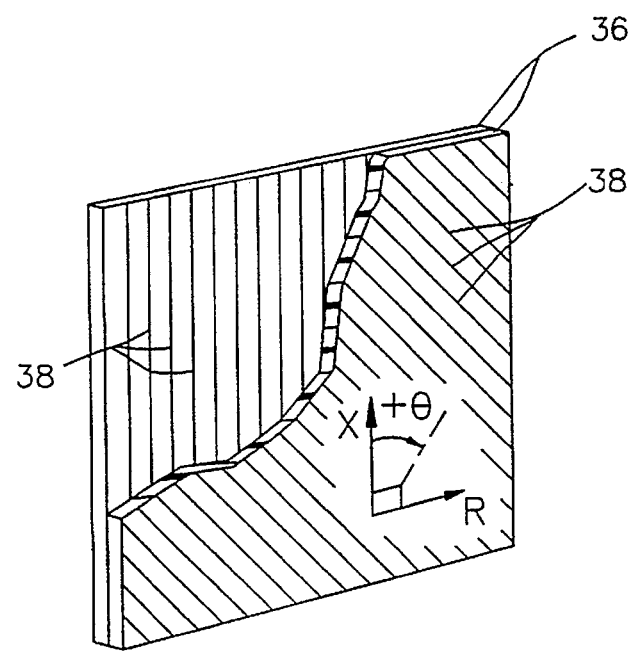
FIG. 10 is an enlarged perspective view of the plies indicated by broken lines in FIG. 9.

As mentioned previously, the buttress form of groove is useful in any application where high shear loads are to be transferred between structures in one direction only. FIG. 9 illustrates a modification of the fiber reinforced composite structure according to the present invention wherein the plies 36 fan radially outward from the longitudinal axis 64 of the structure to form a cylinder 66 having an outer peripheral surface 68 and an inner peripheral surface 70. A local laminate X-R coordinate system can be defined for cylinder 66 wherein the X axis corresponds to the axial or longitudinal axis 64 of the cylinder and R corresponds to the radial direction. Ply orientation angle θ is measured from the longitudinal axis 64 in the direction of the radial axis R and, as such, the positive θ direction is the same around the circumference of the cylinder. As best seen in FIG. 10, plies 36 are oriented relative to the longitudinal axis 64 of the cylinder so as to maximize the number of off-axis (i.e., non-zero degree) plies with fibers 38 oriented at angles θ between about −30° and about −60° relative to the axial or longitudinal X axis. Referring again to FIG. 9, it can be seen that annular buttress grooves 72, similar in longitudinal cross-section to buttress grooves 10, are formed at axially spaced locations along inner or outer peripheral surfaces of the cylinder 66 to transfer loads to and from the fiber reinforced composite structure.

From the above, it will be appreciated that the fiber reinforced composite structure of the present invention can be used in any application requiring transmission of high shear loads in one direction between structural components, including applications involving breech mechanisms in large guns, power screws or columns in hydraulic presses, airplane propeller hubs, splines for transmitting torque, quick-disconnect type devices, threaded or grooved devices used to transmit axial thrust, or rack and pinion systems designed to transmit shear loads to a planar surface or to stop planar motion. At least one of the structural components in the above applications is a laminated composite according to the present invention; however, it will be appreciated that the present invention makes possible transmission of shear loads between fiber reinforced composite components or between a fiber reinforced composite component and a component made of metal, ceramic or any other material. The matrix can be made of any suitable material including, for example, thermoplastic and thermosetting polymers, metals and ceramic materials. The fibers can be made of any material having high tensile strength including, for example, glass and graphite. Furthermore, the fibers can be long and continuous in which case the fibers will extend the length of a ply, or the fibers can be short or long and discontinuous in which case the fibers will be aligned or parallel but will not extend the entire length of a ply.

The buttress grooves shown and described herein can have any configuration to transmit shear loads in one direction between structures, including, for example, configurations wherein the pressure flank is nearly perpendicular to the longitudinal axis of the structures and the front flank is angled relative to the pressure flank in a direction opposite the loading or thrust. The buttress grooves can be defined at longitudinally spaced locations along an edge of a flat laminate or by spaced or continuous threads formed on inner or outer surfaces of a tubular or cylindrical laminate.

Inasmuch as the present invention is subject to many variations, modifications and changes in detail, it is intended that all subject matter discussed above or shown in the accompanying drawings be interpreted as illustrative only and not be taken in a limiting sense.

What is claimed is:

1. A fiber reinforced composite structure for transmitting high shear loads comprising:
   a laminate including a plurality of plies having fibers disposed in a matrix material, said fibers of each ply having an angular orientation relative to a longitudinal axis of said laminate, wherein a first plurality of said plies have fibers oriented parallel to said longitudinal axis and a majority of the other plies have fibers oriented at an angle θ of between −30° and −60° relative to said longitudinal axis; and
   a plurality of spaced buttress grooves defining an edge of said laminate, each of said buttress grooves comprising:
   a pressure flank oriented substantially perpendicular to said longitudinal axis;
   a front flank tilted away from the pressure flank at an angle ranging from about 30° to 60°;
   a flat or bottom land extending across the bottom of each groove between the pressure flank and front flank; and
   a crest or top land of similar size to the flat and extending horizontally between adjacent grooves.

2. A fiber reinforced composite structure as recited in claim 1 wherein said plies are arranged according to a $[0_i/\phi_j/\theta_k]_s$ laminate architecture, wherein 0, $\phi$, and θ denote angular orientations of said fibers in respective plies relative to said longitudinal axis; i, j and k are integers denoting the number of plies having a particular angular orientation; i is greater than zero; and k is greater than j.

3. A fiber reinforced composite structure as recited in claim 2 wherein θ is about −45°.

4. A fiber reinforced composite structure as recited in claim 3 wherein i is equal to two, j is equal to zero and k is equal to two.

5. A fiber reinforced composite structure as recited in claim 1 wherein θ is about −45°.

6. A fiber reinforced composite structure as recited in claim 5 wherein each of said buttress grooves includes a front flank oriented substantially perpendicular to said majority of fibers oriented at an angle relative to said longitudinal axis.

7. A fiber reinforced composite structure as recited in claim 6 wherein the flats and crests of said buttress grooves are substantially parallel to said longitudinal axis.

8. A fiber reinforced composite structure as recited in claim 7 wherein said plies form a substantially flat plate and said buttress grooves define by an edge of said plate.

9. A fiber reinforced composite structure as recited in claim 7 wherein said plies form a substantially cylindrical structure and said buttress grooves are in the form of radial grooves in a peripheral surface of said structure.

10. A method of forming a fiber reinforced composite structure comprising the steps of:
    arranging plies of a laminate such that a first plurality of plies have fibers oriented parallel to a longitudinal axis of the structure and a majority of the other plies have fibers oriented at an angle θ of between −30° and −60° relative to the longitudinal axis; and
    forming a plurality of spaced buttress grooves along an edge of said laminate, each of said buttress grooves comprising:
    a pressure flank oriented substantially perpendicular to said longitudinal axis;
    a front flank tilted away from the pressure flank at an angle ranging from about 30° to 60°;
    a flat or bottom land extending across the bottom of each groove between the pressure flank and front flank; and
    a crest or top land of similar size to the flat and extending horizontally between adjacent grooves.

11. A method of forming a fiber reinforced composite structure as recited in claim 10 wherein said arranging step includes orienting plies such that θ is about −45° relative to the longitudinal axis.

\* \* \* \* \*